(12) United States Patent
Schoenberg

(10) Patent No.: US 12,518,543 B2
(45) Date of Patent: Jan. 6, 2026

(54) VEHICLE CONTROL WITH SUN GLARE

(71) Applicant: Ford Global Technologies, LLC, Dearborn, MI (US)

(72) Inventor: Michael Schoenberg, Seattle, WA (US)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 18/466,869

(22) Filed: Sep. 14, 2023

(65) Prior Publication Data

US 2025/0091534 A1    Mar. 20, 2025

(51) Int. Cl.
*G06V 20/56* (2022.01)
*G06V 10/60* (2022.01)

(52) U.S. Cl.
CPC .............. *G06V 20/56* (2022.01); *G06V 10/60* (2022.01); *B60W 2420/40* (2013.01); *B60W 2420/403* (2013.01); *B60W 2555/20* (2020.02); *G06T 2207/30252* (2013.01)

(58) Field of Classification Search
None
See application file for complete search history.

(56) References Cited

U.S. PATENT DOCUMENTS

| | | | |
|---|---|---|---|
| 10,558,873 B2 | 2/2020 | Hermalyn et al. | |
| 11,561,108 B2 | 1/2023 | Dittmer et al. | |
| 2014/0214255 A1* | 7/2014 | Dolgov | G05D 1/0276 |
| | | | 701/23 |
| 2015/0266488 A1* | 9/2015 | Solyom | B60W 10/04 |
| | | | 701/28 |
| 2018/0134289 A1* | 5/2018 | Kokido | B62D 6/00 |
| 2020/0183386 A1 | 6/2020 | Creusot | |
| 2023/0036840 A1* | 2/2023 | Geraldy | B60K 35/28 |
| 2023/0154200 A1* | 5/2023 | Gong | G06V 20/584 |
| | | | 345/419 |
| 2024/0051527 A1* | 2/2024 | Yuan | G08G 1/146 |

FOREIGN PATENT DOCUMENTS

CN    115146014 A  * 10/2022  ............. G06F 16/23

OTHER PUBLICATIONS

Oxford English Dictionary, "map (n.1)," Mar. 2025, https://doi.org/10.1093/OED/8575475703 (Year: 2025).*
Li et al., "Eliminating Sun Glare Disturbance at Signalized Intersections by a Vehicle to Infrastructure Wireless Communication", TranLIVE/TSU/16/04, https://rosap.ntl.bts.gov/view/dot/32559/dot_32559_DS1.pdf.

* cited by examiner

*Primary Examiner* — Peter D Nolan
*Assistant Examiner* — Michael F Whalen
(74) *Attorney, Agent, or Firm* — Frank A. Mackenzie; Brooks Kushman P.C.

(57) ABSTRACT

A computer includes a processor and a memory, and the memory stores instructions executable by the processor to receive sensor data from an optical sensor of a vehicle, determine a predicted effect of sunlight on at least a portion of a field of view of the optical sensor, determine an adjustment to the sensor data based on the predicted effect of the sunlight, and actuate a component of the vehicle based on the sensor data and the adjustment.

20 Claims, 3 Drawing Sheets

VEHICLE CONTROL WITH SUN GLARE

BACKGROUND

Vehicles typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (lidar) devices, and image processing sensors such as cameras.

DETAILED DESCRIPTION

Figure 1:
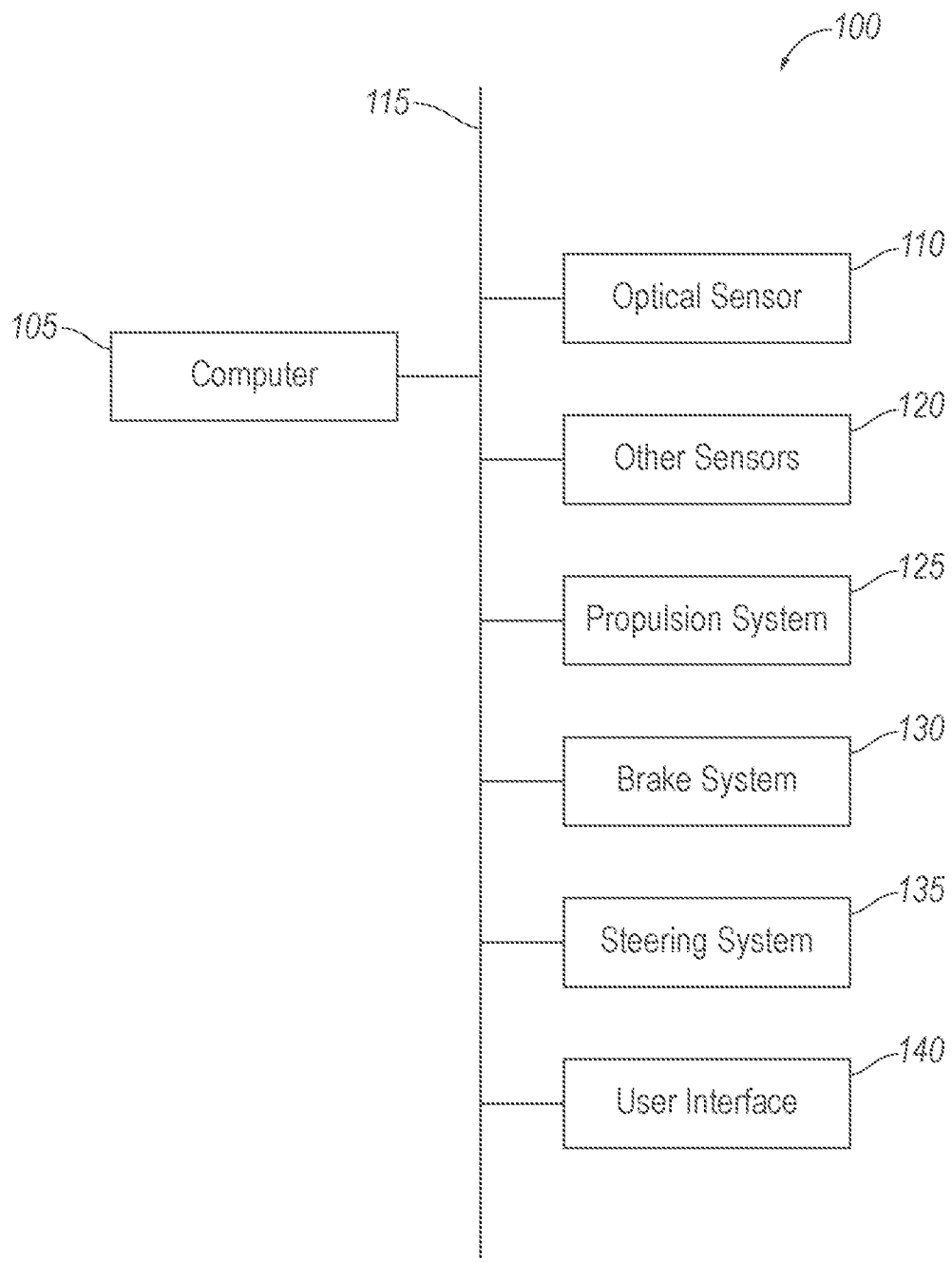
FIG. 1 is a block diagram of an example vehicle.

This disclosure describes techniques for controlling a vehicle in the presence of sun glare by making an adjustment for sensor data received from an optical sensor such as a camera. A computer of the vehicle is programmed to receive sensor data from the optical sensor, determine a predicted effect of sunlight on some or all of the field of view of the optical sensor, determine an adjustment to the sensor data based on the predicted effect of the sunlight, and actuate a component of the vehicle based on the sensor data and the adjustment. For example, the computer may use the predicted effect of the sunlight to generate an illumination map indicating intensity of reflected sunlight at pixels of the field of view of the optical sensor and apply the illumination map to change pixel values of the sensor data. For another example, the computer may use the predicted effect to change a weighting of the sensor data from the optical sensor versus sensor data from another sensor of the vehicle, e.g., a lidar, when performing sensor fusion. For high quantities of sun glare, the sensor data from the optical sensor may be given comparatively less weight and the sensor data from the other sensor given comparatively more weight. The vehicle may thus be operated using the sensor data with an adjustment in high-glare situations in a similar manner as the vehicle would have been operated using the sensor data in low-glare situations.

A computer includes a processor and a memory, the memory storing instructions executable by the processor to receive sensor data from an optical sensor of a vehicle, determine a predicted effect of sunlight on at least a portion of a field of view of the optical sensor, determine an adjustment to the sensor data based on the predicted effect of the sunlight, and actuate a component of the vehicle based on the sensor data and the adjustment.

In an example, the predicted effect of the sunlight may include an illumination map indicating intensity of reflected sunlight. In a further example, determining the adjustment may include executing an algorithm taking the illumination map and the sensor data as inputs.

In another further example, the instructions may further include instructions to determine a reflectance-angle map of the at least a portion of the field of view, the reflectance-angle map indicating angle of reflection of reflected sunlight entering the optical sensor; and determine the illumination map based on the reflectance-angle map.

In another further example, the at least a portion of the field of view may include an object, and the instructions further include instructions to identify the object as a specific type of object, determine a reflectance model of the object based on the specific type of the object, and determine the illumination map based on the reflectance model.

In an example, the instructions may further include instructions to fuse second sensor data from a second sensor with the sensor data from the optical sensor using a first set of weights applied to the sensor data and the second sensor data, and the instructions to determine the adjustment to the sensor data may include instructions to fuse the second sensor data with the sensor data using a second set of weights, the second set of weights being different than the first set of weights. In a further example, the second set of weights may give a greater relative weight to the second sensor data versus the sensor data than the first set of weights gives.

In an example, the at least a portion of the field of view may include an object, and the instructions may further include instructions to determine a position of the object, and determine the predicted effect of the sunlight on the object based on the position of the object. In a further example, the position of the object may include a height of the object, and the instructions may further include instructions to identify the object as a specific type of object, and determine the height of the object based on the specific type of the object.

In another further example, the instructions may further include instructions to determine a reflectance-angle map of the object based on the position of the object, the reflectance-angle map indicating angle of reflection of reflected sunlight entering the optical sensor; and determine the predicted effect of the sunlight based on the reflectance-angle map. In a yet further example, the instructions may further include instructions to determine the reflectance-angle map of the object based on the position of the object and based on a position of the optical sensor.

In an example, the instructions may further include instructions to determine a direction of the sun, and determine the predicted effect of the sunlight based on the direction of the sun. In a further example, the instructions may further include instructions to determine the direction of the sun based on a position of the vehicle and a time and date.

In an example, the instructions may further include instructions to determine a normal map of the at least a portion of the field of view, and determine the predicted effect of the sunlight on the at least a portion of the field of view based on the normal map. In a further example, the at least a portion of the field of view may include an object, and the instructions may further include instructions to identify the object as a specific type of object, and determine the normal map of the object based on the specific type of the object. In a yet further example, the instructions may further include instructions to select a prestored normal map associated with the specific type of the object as the normal map.

In another further example, the instructions may further include instructions to determine a direction of the sun;

determine an incident-angle map of the at least a portion of the field of view based on the normal map and the direction of the sun, the incident-angle map indicating angles of incidence of the sunlight on the at least a portion of the field of view; and determine the predicted effect of the sunlight on the at least a portion of the field of view based on the incident-angle map.

In an example, the instructions may further include instructions to determine that an occlusion is present between the sun and the at least a portion of the field of view, and determine the predicted effect of the sunlight based on the occlusion.

In an example, the optical sensor may be a color camera.

A method includes receiving sensor data from an optical sensor of a vehicle, determining a predicted effect of sunlight on at least a portion of a field of view of the optical sensor, determining an adjustment to the sensor data based on the predicted effect of the sunlight, and actuating a component of the vehicle based on the sensor data and the adjustment.

With reference to the Figures, wherein like numerals indicate like parts throughout the several views, a computer 105 includes a processor and a memory, and the memory stores instructions executable by the processor to receive sensor data from an optical sensor 110 of a vehicle 100, determine a predicted effect of sunlight on at least a portion of a field of view of the optical sensor 110, determine an adjustment to the sensor data based on the predicted effect of the sunlight, and actuate a component of the vehicle 100 based on the sensor data and the adjustment.

With reference to FIG. 1, the vehicle 100 may be any passenger or commercial automobile such as a car, a truck, a sport utility vehicle, a crossover, a van, a minivan, a taxi, a bus, etc. The vehicle 100 may include the computer 105, a communications network 115, the optical sensor 110, other sensors 120, a propulsion system 125, a brake system 130, a steering system 135, and a user interface 140.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 115. The communications network 115 may be, e.g., a controller area network (CAN) bus, Ethernet, WiFi, Local Interconnect Network (LIN), onboard diagnostics connector (OBD-II), and/or any other wired or wireless communications network. The computer 105 may be communicatively coupled to the optical sensor 110, the other sensors 120, the propulsion system 125, the brake system 130, the steering system 135, the user interface 140, and other components via the communications network 115.

The optical sensor 110 can detect electromagnetic radiation in some range of wavelengths. For example, the optical sensor 110 may detect visible light, infrared radiation, ultraviolet light, or some range of wavelengths including visible, infrared, and/or ultraviolet light. For example, the optical sensor 110 may be a camera, e.g., a color camera, such as a charge-coupled device (CCD), complementary metal oxide semiconductor (CMOS), or any other suitable type. For another example, the sensors may be a time-of-flight (TOF) cameras, which include a modulated light source for illuminating the environment and detect both reflected light from the modulated light source and ambient light to sense reflectivity amplitudes and distances to the scene.

The other sensors 120 provide a variety of data. The other sensors 120 may provide data about operation of the vehicle 100, for example, wheel speed, wheel orientation, and engine and transmission data (e.g., temperature, fuel consumption, etc.). The other sensors 120 may detect the location and/or orientation of the vehicle 100. For example, the other sensors 120 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The other sensors 120 may detect the external world, e.g., objects and/or characteristics of surroundings of the vehicle 100, such as other vehicles, road lane markings, traffic lights and/or signs, pedestrians, etc. For example, the other sensors 120 may include radar sensors, ultrasonic sensors, scanning laser range finders, light detection and ranging (lidar) devices, and other optical sensors besides the optical sensor 110.

The propulsion system 125 of the vehicle 100 generates energy and translates the energy into motion of the vehicle 100. The propulsion system 125 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 125 can include an electronic control unit (ECU) or the like that is in communication with and receives input from the computer 105 and/or a human operator. The human operator may control the propulsion system 125 via, e.g., an accelerator pedal and/or a gear-shift lever.

The brake system 130 is typically a conventional vehicle braking subsystem and resists the motion of the vehicle 100 to thereby slow and/or stop the vehicle 100. The brake system 130 may include friction brakes such as disc brakes, drum brakes, band brakes, etc.; regenerative brakes; any other suitable type of brakes; or a combination. The brake system 130 can include an electronic control unit (ECU) or the like that is in communication with and receives input from the computer 105 and/or a human operator. The human operator may control the brake system 130 via, e.g., a brake pedal.

The steering system 135 is typically a conventional vehicle steering subsystem and controls the turning of the wheels of the vehicle 100. The steering system 135 may be a rack-and-pinion system with electric power-assisted steering, a steer-by-wire system, as both are known, or any other suitable system. The steering system 135 can include an electronic control unit (ECU) or the like that is in communication with and receives input from the computer 105 and/or a human operator. The human operator may control the steering system 135 via, e.g., a steering wheel.

The user interface 140 presents information to and receives information from a human operator of the vehicle 100. The user interface 140 may be located, e.g., on an instrument panel in a passenger compartment of the vehicle 100, and/or wherever may be readily seen by the operator. The user interface 140 may include dials, digital readouts, screens, speakers, and so on for providing information to the operator, e.g., human-machine interface (HMI) elements such as are known. The user interface 140 may include buttons, knobs, keypads, microphone, and so on for receiving information from the operator.

Figure 2:
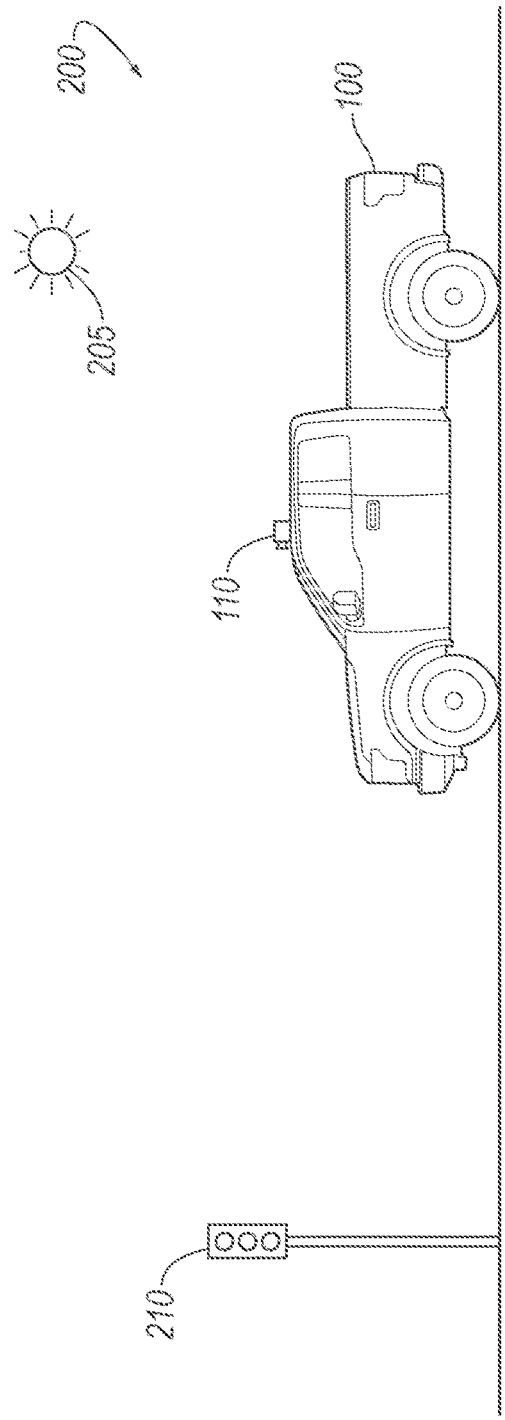
FIG. 2 is a diagrammatic side view of the vehicle in an example environment with the sun out.

With reference to FIG. 2, the vehicle 100 may be driving through an environment 200 in which the sun 205 is shining. Some of the light detected by the optical sensor 110 may be sunlight directly reflected off of objects 210 in the environment 200 that are in the field of view of the optical sensor 110. The quantity of reflected sunlight detected by the optical sensor 110 may affect the ability of the computer 105 to discern features of the environment 200 from the sensor data returned by the optical sensor 110. As described below, the computer 105 may use the adjustment to the sensor data to help compensate for the reflected sunlight detected by the optical sensor 110.

The computer 105 is programmed to receive the sensor data from the optical sensor 110. The sensor data may be a sequence of image frames of the field of view of the optical sensor 110. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame, i.e., position in the field of view of the optical sensor 110 at the time that the image frame was recorded, can be specified in pixel dimensions or coordinates, e.g., an ordered pair of pixel distances, such as a number of pixels from a top edge and a number of pixels from a left edge of the image frame.

The computer 105 may be programmed to identify the object 210 as a specific type of object, i.e., to classify the object 210. In the example of FIG. 2, the object 210 may be identified as a traffic light. For example, the computer 105 can identify the object 210 as a specific type using conventional image-recognition techniques, e.g., a convolutional neural network programmed to accept images as input and output the specific type for the object 210. The computer 105 may store a set of potential types, e.g., {"pedestrian," "bicycle," "consumer vehicle," "commercial truck," "animal," "guardrail," "bollard," "traffic sign," "traffic light," . . . }. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type, and the final output is the type with the highest score, e.g., "traffic light." For another example, the computer 105 may receive a message from an external source indicating the specific type of the object 210, e.g., a vehicle-to-infrastructure (V2I) message from an infrastructure item identifying nearby infrastructure items or a vehicle-to-vehicle (V2V) message from another vehicle identifying itself. For another example, the computer 105 may use map data indicating a type of object at a position occupied by the object 210 in the environment 200. The computer 105 may determine the position of the object 210, e.g., in two horizontal dimensions, based on range data from a radar or lidar of the other sensors 120, and then check the map data for identified objects at that position.

The computer 105 may be programmed to determine a position of the object 210. The position may be specified with respect to a coordinate system fixed relative to the environment 200 or fixed relative to the vehicle 100. The position may be a three-dimensional position, e.g., including two horizontal dimensions and a height.

For example, the computer 105 may determine the position of the object 210 using sensor data from one or more of the other sensors 120, e.g., range data from one or more ranging sensors such as radars and/or lidars. The range data may be, e.g., a point cloud. The points of the point cloud specify respective positions in the environment 200 relative to the position of the ranging sensor. For example, the range data can be in spherical coordinates with the ranging sensor at the origin of the spherical coordinate system. The spherical coordinates can include a radial distance, i.e., a measured depth from the ranging sensor to the point measured by the ranging sensor; a polar angle, i.e., an angle from a vertical axis through the ranging sensor to the point measured by the ranging sensor; and an azimuthal angle, i.e., an angle in a horizontal plane from a horizontal axis through the ranging sensor to the point measured by the ranging sensor. The horizontal axis can be, e.g., along a vehicle-forward direction. Alternatively, the ranging sensor can return the points as Cartesian coordinates with the ranging sensor at the origin or as coordinates in any other suitable coordinate system, or the computer 105 can convert the spherical coordinates to Cartesian coordinates or another coordinate system after receiving the range data.

For another example, the computer 105 may determine the position of the object 210 based on map data and/or the specific type of the object 210. For an object 210 identified using map data or matched with map data, the computer 105 may use a two-dimensional or three-dimensional position of the object 210 taken from the map data. If a two-dimensional position is taken from the map data, the computer 105 may determine the height of the object 210 based on the specific type of the object 210, e.g., by consulting a lookup table pairing types of objects with prestored heights. Each prestored height may be chosen as an average or typical height of the corresponding type of object, e.g., 18 feet for the type "traffic light." Alternatively, the prestored heights may be used in combination with a two-dimensional position of the object 210 derived from range data. By using prestored heights, the techniques described below may be used even without detailed range data or detailed map data.

Figure 3:
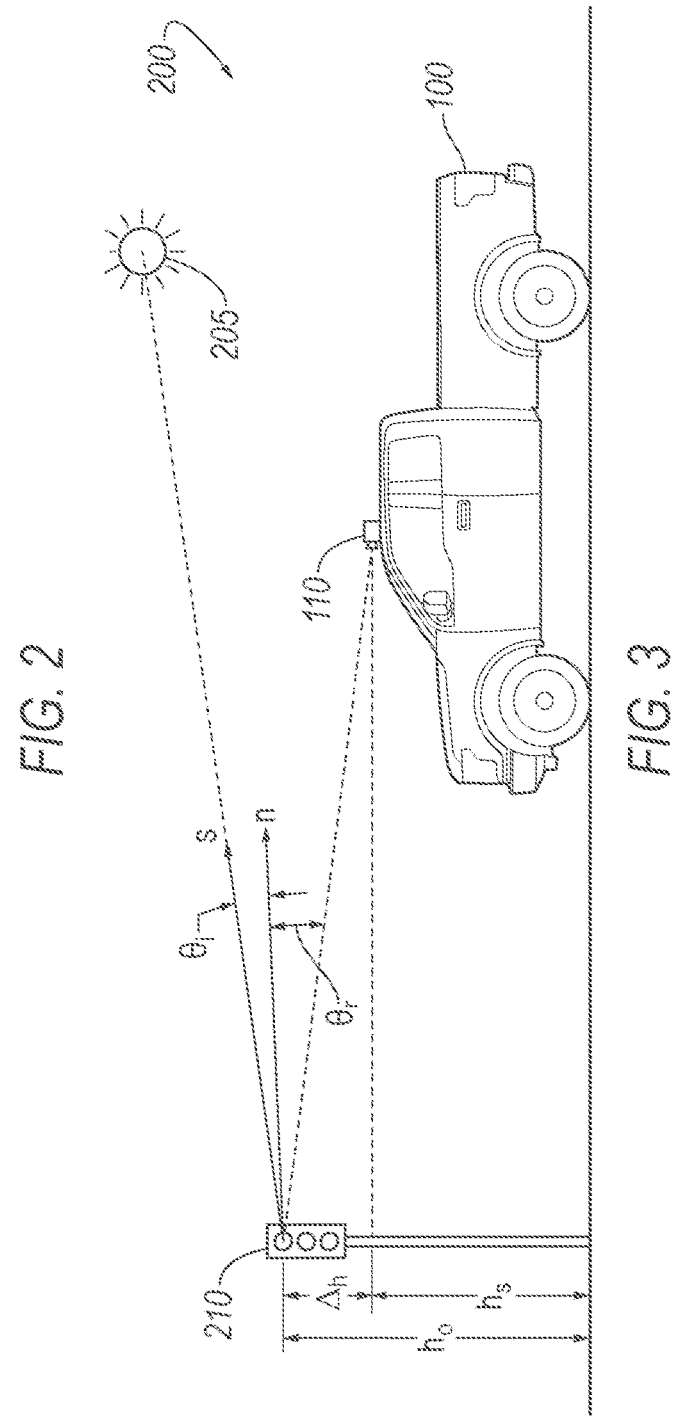
FIG. 3 is a diagrammatic side view of the vehicle in the environment showing sunlight reflected to an optical sensor of the vehicle.

With reference to FIG. 3, the computer 105 is programmed to determine a direction of the sun 205. The direction of the sun 205 is the direction from the environment 200 pointing toward the sun 205. Because of the great distance of the sun 205 from the earth, the direction of the sun 205 is effectively the same from every point in the environment 200. The direction may be described with two angles, e.g., an elevation angle and an azimuth angle, or with a three-dimensional unit vector s.

The computer 105 may determine the direction of the sun 205 based on a position of the vehicle 100 and a current time and date. The computer 105 may receive the position of the vehicle 100 from one of the other sensors 120, e.g., a GPS sensor. The computer 105 may store and track the time and date with a built-in clock functionality. For example, the computer 105 may use the following formulas for the elevation angle $\alpha$ and the azimuth angle $\beta$:

$$\alpha = \sin^{-1}(\sin\delta\sin\varphi + \cos\delta\cos\varphi\cos\gamma)$$

$$\beta = \begin{cases} \cos^{-1}\left(\frac{\sin\delta\cos\varphi - \cos\delta\sin\varphi\cos\gamma}{\cos\alpha}\right), & \text{if } \gamma < 0° \\ 360° - \cos^{-1}\left(\frac{\sin\delta\cos\varphi - \cos\delta\sin\varphi\cos\gamma}{\cos\alpha}\right), & \text{if } \gamma \geq 0° \end{cases}$$

in which $\delta$ is the declination angle of the earth with respect to the sun 205, $\varphi$ is the latitude of the vehicle 100, and $\gamma$ is the local hour angle. The declination angle $\delta$ depends on the date, the latitude $\varphi$ is from the position of the vehicle 100, and the local hour angle $\gamma$ depends on the time of day. For example, the declination angle $\delta$ may be approximated with the following formula:

$$\delta = -23.45° \times \cos\left[\frac{360}{365}(d+10)\right]$$

in which d is the day of the year counted from January 1. The local hour angle $\gamma$ may be approximated with the following formula:

$$\gamma = 15° \times (T - 12)$$

in which T is the local solar time in hours. The current time may be converted to the local solar time T using the longitude, taken from the position of the vehicle 100. The angular direction ($\alpha$, $\beta$) of the sun 205 may be converted to the unit vector direction s of the sun 205 using geometrical principles.

The computer 105 may be programmed to determine that an occlusion is present between the sun 205 and some portion of the field of view, e.g., the object 210. For example, the computer 105 may determine geometrically that a straight line extending along the sun direction s starting at the object 210 intersects some other object, referred to herein as the "occlusion." The three-dimensional position and extent of the occlusion may be taken from detailed three-dimensional map data stored in the memory of the computer 105, if available. Alternatively or additionally, the three-dimensional position and extent of the occlusion may be defined by the range data.

The computer 105 is programmed to determine the predicted effect of sunlight on some portion of the field of view of the optical sensor 110, e.g., the object 210, or on all of the field of view. The predicted effect may include, e.g., be represented by, an illumination map as described below. The determination of the predicted effect may be based ultimately on the position of the object 210 (or of the point in the field of view), the shape of the object 210, the direction of the sun 205, and the position of the optical sensor 110. As a general overview of the steps that will be described in turn below, the computer 105 may determine a normal map of the object 210 or of the environment 200 within the field of view of the optical sensor 110 using the specific type of the object 210, the range data, and/or the map data; determine an incident-angle map using the direction of the sun 205 and the normal map; determine a reflectance-angle map using the position of the object 210, the position of the optical sensor 110, and the normal map; and determine the illumination map using the normal map, the incident-angle map, the reflectance-angle map, and a reflectance model of the object 210. The illumination map is thus determined based directly on the normal map, the incident-angle map, the reflectance-angle map, and a reflectance model of the object 210. The determination may also be based on the occlusion, if present.

The computer 105 may be programmed to determine the normal map of the object 210 or of the environment 200 within the field of view. A normal map includes surface normals, i.e., vectors perpendicular to respective surfaces, for points on surfaces of the object 210 or the environment 200. For example, the computer 105 can generate the normal map from the perspective of the optical sensor 110 based on a three-dimensional representation of the object 210 or the environment 200. The three-dimensional representation may be, e.g., a mesh of polygonal surfaces. The computer 105 may generate the three-dimensional representation based on, e.g., the range data or optical flow exhibited by a series of image frames. For example, the computer 105 can calculate the surface normal for each polygon of the mesh visible from the perspective of the optical sensor 110.

For another example, the computer 105 may determine the normal map of the object 210 based on the specific type of the object 210. A plurality of prestored normal maps may be stored in the memory of the computer 105 and associated with the potential types of the object 210. The computer 105 may select a prestored normal map associated with the specific type of the object 210 as the normal map.

The computer 105 may fit the generated or selected normal map to the pixel coordinates of the object 210 in the field of view of the optical sensor 110, e.g., using a three-dimensional model-fitting algorithm. Individual pixels or regions of pixels of the field of view of the optical sensor 110 may have associated normal vectors from the normal map.

The computer 105 may be programmed to determine an incident-angle map of the object 210 or the environment 200. The incident-angle map indicates angles of incidence of the sunlight on the object 210 or the environment 200, i.e., the angle between a ray of sunlight landing on a point of the object 210 and the normal vector extending from that point of the object 210. The incident-angle map may include the angles of incidence for individual pixels or regions of pixels, or the incident-angle map may include a single angle of incidence for the object 210. The computer 105 may determine the angles of incidence $\theta_i$ pixel-by-pixel or region-by-region. The computer 105 may determine the incident-angle map based on the normal map and the direction of the sun 205, e.g., as the inverse cosine of the dot product of the sun direction and the normal vector for the respective pixel or region, e.g., according to the following formula:

$$\theta_i = \cos^{-1}(\hat{s} \cdot \hat{n})$$

in which n is the normal vector and the circumflex ("^") indicates that a vector is a unit vector.

The computer 105 may be programmed to determine a reflectance-angle map of the object 210 or the environment 200. The reflectance-angle map indicates angles of reflection of reflected sunlight entering the optical sensor 110, i.e., the angle between a ray of sunlight reflected from a point on the object 210 or in the environment 200 that enters the optical sensor 110 and the normal vector extending from that point of the object 210 or environment 200. The reflectance-angle map may include the angles of reflection for individual pixels or regions of pixels, or the reflectance-angle map may include a single angle of reflection for the object 210. The computer 105 may determine the angles of reflection $\theta_r$ pixel-by-pixel or region-by-region. The computer 105 may determine the reflectance-angle map based on the position of the object 210, the position of the optical sensor 110, and the normal map, e.g., for each point on the object 210 or in the environment 200, as the inverse tangent of the quotient between the difference in height $\Delta h$ between the point and the optical sensor 110 and a distance d, the distance d being measured along the direction of the normal vector from point between the point and the optical sensor 110, i.e., according to the following formula:

$$\theta_r = \tan^{-1}(\Delta h/d)$$

The computer 105 may be programmed to determine a reflectance model of the object 210. A reflectance model provides the proportion of light striking the object 210 that is reflected off of the object 210. The reflectance model may be any suitable type for accurately approximating the reflectance properties of the object 210, e.g., a bidirectional reflectance distribution function (BRDF) such as the Phong model or Blinn-Phong model, the Cook-Torrance model, etc. The reflectance model may take as inputs the normal map, the incident-angle map, and the reflectance-angle map. The reflectance model may provide as output the reflectance at a point on the object 210 or in the environment 200 as a function of the normal vector at the point, the angle of incidence at the point, and the reflectance-angle at the point. The computer 105 may determine the reflectance model based on the specific type of the object 210. For example, a plurality of prestored reflectance models may be stored in the memory of the computer 105 and associated with the potential types of the object 210. The computer 105 may select a prestored reflectance model associated with the specific type of the object 210 as the reflectance model.

The computer 105 may be programmed to determine the illumination map. The illumination map indicates the intensity of the reflected sunlight received by the optical sensor 110. The computer 105 may determine the illumination map based on the reflectance model, the reflectance-angle map, the incident-angle map, and the normal map. For example, the computer 105 may execute the reflectance model using the reflectance-angle map, the incident-angle map, and the normal map as inputs, with the output being multiplied by an intensity of the sunlight shining on the object 210 to arrive at the illumination map.

The computer 105 may be programmed to reduce the illumination map in response to determining that an occlusion is present between the sun 205 and some portion of the field of view, e.g., the object 210. For example, the computer 105 may multiply the illumination map (or the intensity of the sunlight shining on the object 210) by a factor between 0 and 1. The computer 105 may determine the factor based on, e.g., the size of the occlusion, or the computer 105 may use a prestored constant value. The factor represents a fraction of illumination from the sun 205 that reaches the object 210.

The computer 105 is programmed to determine an adjustment to the sensor data from the optical sensor 110 based on the predicted effect of the sunlight, e.g., based on the illumination map. The adjustment to the sensor data may partially counteract the predicted effect of the sunlight. For example, the computer 105 may provide the illumination map as an additional input channel alongside the sensor data to an algorithm taking the sensor data as an input. Alternatively, the adjustment to the sensor data may shift a relative weight or confidence given to the sensor data versus other sources of data. For example, the computer 105 may weight data from one of the other sensors 120 more strongly compared to the sensor data from the optical sensor 110, responsive to higher values in the illumination map.

For example, the computer 105 may be programmed to determine the adjustment to the sensor data by providing the sensor data and the illumination map together as input to an algorithm being executed by the computer 105. For example, the computer 105 may be executing a classification algorithm such as a neural network to, e.g., classify the state of a traffic light, i.e., determine which light(s) of the traffic light is illuminated, e.g., red, yellow, or green. The computer 105 may provide the sensor data of the object 210 being classified, e.g., the traffic light, along with the illumination map of the object 210 being classified to the classification algorithm. The computer 105 may provide a portion of the image frame of the sensor data cropped to include only the object 210, e.g., the traffic light, along with the illumination map cropped or sized to correspond to the same range of pixel coordinates as the portion of the image frame. The illumination map may be provided as an additional input channel to the algorithm. The algorithm may subtract or deemphasize regions of the portion of the image frame with greater reflected sunlight as indicated by the illumination map.

For another example, the computer 105 may be programmed to determine the adjustment to the sensor data by changing a set of weights applied to the sensor data and to sensor data from one of the other sensors 120, which will be referred to as second sensor data. The second sensor data may be, e.g., range data from a radar or lidar of the other sensors 120. The computer 105 may be programmed to fuse the unadjusted sensor data and the second sensor data, i.e., to perform sensor fusion. Sensor fusion is combining data from disparate sources together so that the resulting data has less uncertainty than if the data from each source were used individually, e.g., in creating a unified model of the environment 200 surrounding the vehicle 100. The sensor fusion can be performed with one or more algorithms, e.g., Kalman filter, central limit theorem, Bayesian networks, Dempster-Shafer, convolutional neural networks, etc. In the absence of the illumination map, the computer 105 may fuse the sensor data and the second sensor data using a first set of weights applied to the sensor data and the second sensor data. The set of weights defines the relative contribution made by the sensor data and the second sensor data within the sensor fusion algorithm; e.g., a higher weight for the sensor data than the second sensor data indicates that the sensor data contributes more to the output of the sensor fusion than the second sensor data does. The weights may represent levels of confidence in the respective sensor data. For the example of a convolutional neural network, the set of weights define the strength of the connections between nodes in adjacent layers. In response to the illumination map, e.g., to the values in the illumination map exceeding a threshold, the computer 105 may fuse the sensor data and the second sensor data using a second set of weights applied to the sensor data and the second sensor data. The second set of weights is different than the first set of weights and gives a greater relative weight to the second sensor data versus the sensor data than the first set of weights gives. In other words, the adjustment to the sensor data is a change in the set of weights. For example, the first set of weights may give a weight of 2 to the sensor data and a weight of 1 to the second sensor data, and the second set of weights may give a weight of 1.5 to the sensor data and a weight of 1.5 to the second sensor data. The second set of weights may be prestored in the memory of the computer 105, or the second set of weights may be a function of the values of the illumination map.

The computer 105 is programmed to actuate a component of the vehicle 100 based on the sensor data and the adjustment, e.g., based on the output of an algorithm taking the sensor data and the illumination map as inputs or based on taking the sensor data as an input with weights changed from the illumination map. The component may include, e.g., the propulsion system 125, the brake system 130, the steering system 135, and/or the user interface 140. For example, the computer 105 may actuate the component in executing an advanced driver assistance system (ADAS). ADAS are groups of electronic technologies that assist drivers in driving and parking functions. Examples of ADAS include forward proximity detection, lane-departure detection, blind-spot detection, braking actuation, adaptive cruise control, and lane-keeping assistance systems. As one example, in response to the algorithm described above indicating that a traffic light is red, the computer 105 may actuate the brake system 130 to brake the vehicle 100 or may actuate the user interface 140 to display an indicator of the red light on the instrument panel. In response to the algorithm indicating that a traffic light is green when the vehicle 100 is stationary, the computer 105 may actuate the user interface 140 to display an indicator of the green light on the instrument panel, as well as possibly sound a chime. For another example, the computer 105 may operate the vehicle 100 autonomously, i.e., actuating the propulsion system 125, the brake system 130, and the steering system 135 based on the environment 200 as represented in a sensor fusion model as described above, e.g., to navigate around the environment 200.

Figure 4:
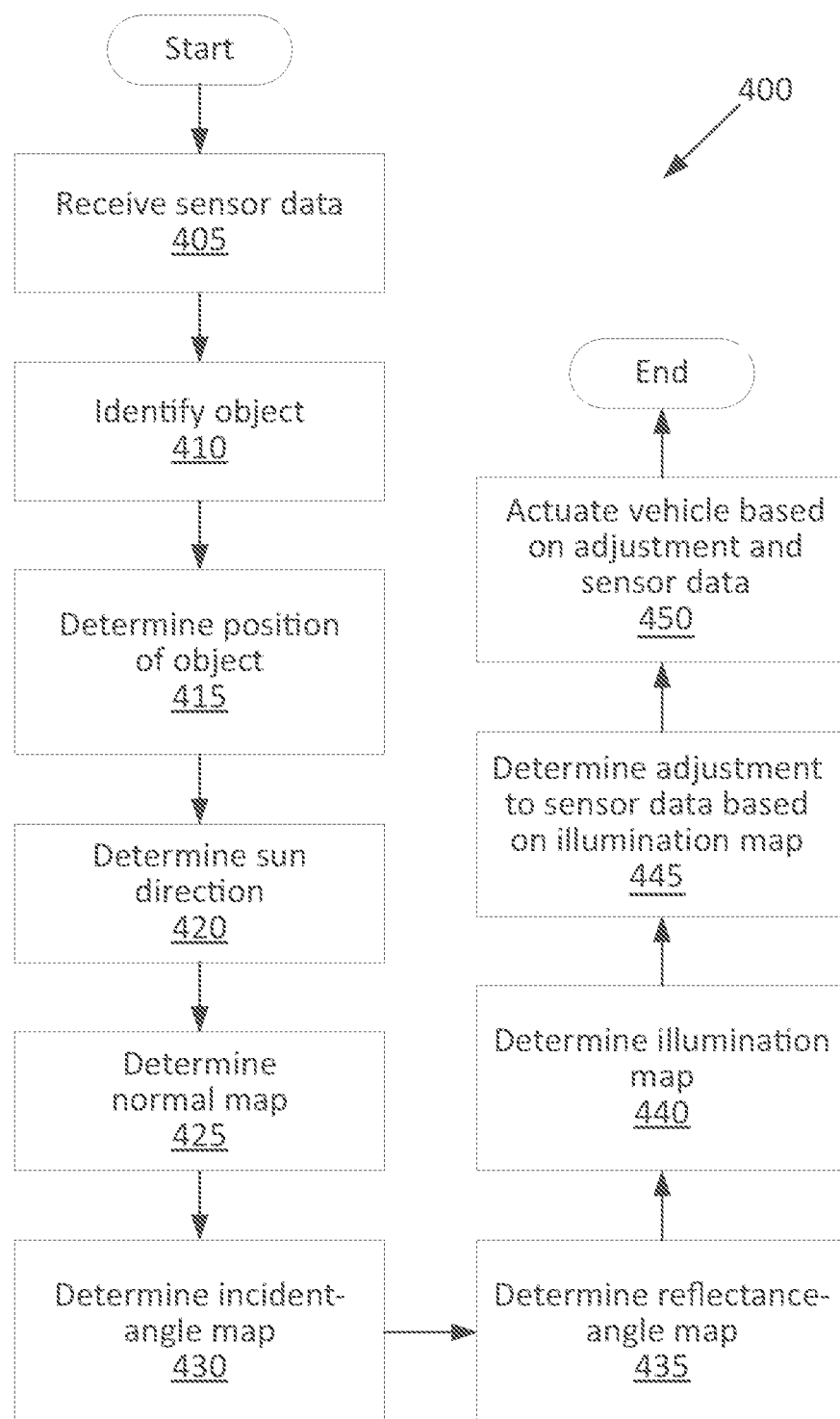
FIG. 4 is a flowchart of an example process for controlling the vehicle based on a predicted effect of the sunlight reflected to the optical sensor.

FIG. 4 is a flowchart illustrating an example process 400 for controlling the vehicle 100 based on a predicted effect of the sunlight reflected to the optical sensor 110. The memory of the computer 105 stores executable instructions for performing the steps of the process 400 and/or programming can be implemented in structures such as mentioned above. As a general overview of the process 400, the computer 105 receives sensor data from the optical sensor 110 and the other sensors 120, identifies an object 210 in the sensor data, determines a position of the object 210, determines a direction of the sun 205, determines a normal map, determines an incident-angle map, determines a reflectance-angle map, determines an illumination map, determines the adjustment to the sensor data, and actuates a component of the vehicle 100 based on the sensor data and the adjustment. The computer 105 may execute the process 400 whenever the vehicle 100 is on or only when a system for semi-autonomous or autonomous operation of the vehicle 100 is on.

The process 400 begins in a block 405, in which the computer 105 receives the sensor data from the optical sensor 110 and sensor data such as range data and GPS data from the other sensors 120, as described above.

Next, in a block 410, the computer 105 identifies the object 210 as a specific type of object, as described above.

Next, in a block 415, the computer 105 determines a position of the object 210, as described above.

Next, in a block 420, the computer 105 determines a direction of the sun 205 based on a position of the vehicle 100 and a current time and date, as described above.

Next, in a block 425, the computer 105 determines a normal map of the object 210 or of the environment 200 within the field of view, as described above.

Next, in a block 430, the computer 105 determines an incident-angle map of the object 210 or of the environment 200 within the field of view based on the normal map and the direction of the sun 205, as described above.

Next, in a block 435, the computer 105 determines a reflectance-angle map of the object 210 or of the environment 200 within the field of view based on the position of the object 210, the position of the optical sensor 110, and the normal map, as described above.

Next, in a block 440, the computer 105 determines the illumination map, as described above.

Next, in a block 445, the computer 105 determines the adjustment to the sensor data based on the predicted effect of the sunlight, e.g., the illumination map, as described above.

Next, in a block 450, the computer 105 actuates a component of the vehicle 100 based on the sensor data and the adjustment, as described above. After the block 450, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Use of "in response to," "upon determining," etc. indicates a causal relationship, not merely a temporal relationship. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   receive sensor data from an optical sensor of a vehicle;
   determine a reflectance-angle map of at least a portion of a field of view of the optical sensor, the reflectance-angle map including angles of reflection of reflected sunlight entering the optical sensor mapped to respective locations within the field of view of the optical sensor, each angle of reflection being an angle between a reflected ray of sunlight reflected from a point in an environment surrounding the vehicle that enters the optical sensor and a normal vector extending from that point of the environment;
   determine a predicted effect of sunlight on the at least a portion of the field of view of the optical sensor based on the reflectance-angle map;
   determine an adjustment to the sensor data based on the predicted effect of the sunlight; and
   actuate a component of the vehicle based on the sensor data and the adjustment.

2. The computer of claim 1, wherein the predicted effect of the sunlight includes an illumination map, the illumination map including intensities of the reflected sunlight entering the optical sensor mapped to respective locations within the field of view of the optical sensor.

3. The computer of claim 2, wherein determining the adjustment includes executing an algorithm taking the illumination map and the sensor data as inputs.

4. The computer of claim 2, wherein the instructions further include instructions to:
   determine the illumination map based on the reflectance-angle map.

5. The computer of claim 2, wherein the at least a portion of the field of view includes an object, and the instructions further include instructions to:
   identify the object as a specific type of physical object;
   determine a reflectance model of the object based on the specific type of the object; and
   determine the illumination map based on the reflectance model.

6. The computer of claim 1, wherein:
   the instructions further include instructions to fuse second sensor data from a second sensor with the sensor data from the optical sensor using a first set of weights applied to the sensor data and the second sensor data; and
   the instructions to determine the adjustment to the sensor data include instructions to fuse the second sensor data with the sensor data using a second set of weights, the second set of weights being different than the first set of weights.

7. The computer of claim 6, wherein the second set of weights gives a greater relative weight to the second sensor data versus the sensor data than the first set of weights gives.

8. The computer of claim 1, wherein the at least a portion of the field of view includes an object, and the instructions further include instructions to:
   determine a position of the object; and
   determine the predicted effect of the sunlight on the object based on the position of the object.

9. The computer of claim 8, wherein the position of the object includes a height of the object, and the instructions further include instructions to:
identify the object as a specific type of object; and
determine the height of the object based on the specific type of the object.

10. The computer of claim 8, wherein the instructions further include instructions to:
determine the reflectance-angle map based on the position of the object.

11. The computer of claim 10, wherein the instructions further include instructions to determine the reflectance-angle map based on the position of the object and based on a position of the optical sensor.

12. The computer of claim 1, wherein the instructions further include instructions to:
determine a direction of the sun; and
determine the predicted effect of the sunlight based on the direction of the sun.

13. The computer of claim 12, wherein the instructions further include instructions to determine the direction of the sun based on a position of the vehicle and a time and date.

14. The computer of claim 1, wherein the instructions further include instructions to:
determine a normal map of the at least a portion of the field of view, the normal map including normal vectors of surfaces mapped to respective locations within the field of view of the optical sensor; and
determine the predicted effect of the sunlight on the at least a portion of the field of view based on the normal map.

15. The computer of claim 14, wherein the at least a portion of the field of view includes an object, and the instructions further include instructions to:
identify the object as a specific type of object; and
determine the normal map of the object based on the specific type of the object.

16. The computer of claim 15, wherein the instructions further include instructions to select a prestored normal map associated with the specific type of the object as the normal map.

17. The computer of claim 14, wherein the instructions further include instructions to:
determine a direction of the sun;
determine an incident-angle map of the at least a portion of the field of view based on the normal map and the direction of the sun, the incident-angle map including angles of incidence of the sunlight mapped to respective locations within the field of view of the optical sensor, each angle of incidence being an angle between a ray of sunlight landing on a point in the environment and the normal vector extending from that point of the environment; and
determine the predicted effect of the sunlight on the at least a portion of the field of view based on the incident-angle map.

18. The computer of claim 1, wherein the instructions further include instructions to:
determine that an occlusion is present between the sun and the at least a portion of the field of view; and
determine the predicted effect of the sunlight based on the occlusion.

19. The computer of claim 1, wherein the optical sensor is a color camera.

20. A method comprising:
receiving sensor data from an optical sensor of a vehicle;
determining a reflectance-angle map of at least a portion of a field of view of the optical sensor, the reflectance-angle map including angles of reflection of reflected sunlight entering the optical sensor mapped to respective locations within the field of view of the optical sensor, each angle of reflection being an angle between a ray of sunlight reflected from a point in an environment surrounding the vehicle that enters the optical sensor and a normal vector extending from that point of the environment;
determining a predicted effect of sunlight on the at least a portion of the field of view of the optical sensor based on the reflectance-angle map;
determining an adjustment to the sensor data based on the predicted effect of the sunlight; and
actuating a component of the vehicle based on the sensor data and the adjustment.

* * * * *